US006834359B2

United States Patent
Boehm et al.

(10) Patent No.: US 6,834,359 B2
(45) Date of Patent: Dec. 21, 2004

(54) METHOD AND SYSTEM FOR TESTING A PROCESSOR

(75) Inventors: Harald Boehm, Schoenaich (DE); Joachim von Buttlar, Schoenaich (DE); Axel Horsch, Boeblingen (DE); Joerg Kayser, Waldenbuch (DE); Stefan Koerner, Leinfelden-Echterdingen (DE); Martin Kuenzel, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 09/960,154

(22) Filed: Sep. 21, 2001

(65) Prior Publication Data

US 2002/0087917 A1 Jul. 4, 2002

(30) Foreign Application Priority Data

Sep. 22, 2000 (EP) .......................................... 00120734

(51) Int. Cl.⁷ ................................................ G06F 11/00
(52) U.S. Cl. ............................. 714/28; 714/33; 703/22; 703/26; 717/134; 717/135
(58) Field of Search ............................. 714/28, 29, 33, 714/38; 717/134, 135; 703/22, 26, 28

(56) References Cited

U.S. PATENT DOCUMENTS

2004/0039966 A1 * 2/2004 Petsinger et al. ............. 714/28

FOREIGN PATENT DOCUMENTS

WO    WO 97/13209    4/1997

OTHER PUBLICATIONS

Chang et al., "Verification of a Microprocessor Using Real World Applications", Jun. 1999, IEEE, pp. 181–184.*

"An Integrated CAD System for Algorithm–Specific IC Design," C. S. Shung, R. Jain, K. Rimey, E. Wang, M. Srivastava, E. Lettang, S. K. Azim, P. N. Hilfinger, J. Rabaey, R. W. Brodersen, 1989 IEEE, pp. 82–91.

* cited by examiner

Primary Examiner—Scott Baderman
(74) Attorney, Agent, or Firm—Rafael A. Perez-Pineiro

(57) ABSTRACT

A method for verifying the correctness of the functional behavior of a processor cooperating with software is provided. Furthermore, the method allows verification of a CPU having at least a part of its instruction set implemented with microcode. First, the microcode is independently tested by using a functional emulator performing in the same way as the processor hardware according to the processor's functional specification. Then, the microcode is tested by using a hardware emulator behaving in the same way as the processor hardware according to the design of the processor's logic gates. Finally, the microcode is tested against the actual processor hardware. This method allows the functionality of a newly designed CPU to be checked in a simulation, even before actual system integration. Advantageously, many problems in this area, relating to the interaction of the microcode and the processor hardware can be found before the actual processor hardware is manufactured. Furthermore, the ongoing verification of the newly designed CPU using the method according to the present invention allows detection of problems with the processor hardware at a relatively early stage.

16 Claims, 1 Drawing Sheet

METHOD AND SYSTEM FOR TESTING A PROCESSOR

FIELD OF THE INVENTION

The present invention relates to the field of test and verification of a new digital system combining software and processor hardware. In particular, the present invention relates to a method and system for verifying the correctness of the system behavior of a processor cooperating with software.

BACKGROUND OF THE INVENTION

In the following, the expression "central processing unit" (CPU) refers to a portion of a computer that controls all the other parts and provides an architectural interface for application programs running on the computer. The expression "processor" refers to a portion of the CPU that is implemented in hardware and comprises a control unit, i.e., a part of the processor responsible for performing the machine cycle comprising the steps of fetching, decoding, executing, storing, an arithmetic and logic unit (ALU) and memory, such as registers, cache, RAM (Random Access Memory) and ROM (Read-Only Memory) as well as various temporary buffers and other logic.

The expression "microcode" denotes a technique for implementing the instruction set of a CPU as a sequence of microcode instructions, also called "microinstructions". In contrast, the instruction set of the CPU is also called "macroinstrutions" or "machine language" and actually defines the architectural interface of the CPU.

Each of the microinstructions typically consists of a large number of bit fields and the address of the next microinstruction to execute. Each bit field controls some specific part of the processor's operation, such as a gate which allows some functional unit to drive a value onto the bus or the operation to be performed by the ALU (Arithmetic and Logic Unit). A functional unit is basically a subsystem of the central processing unit of a computer, and the bus is basically one of the sets of conductors, e.g., wires or connections in an integrated circuit, connecting the various functional units in a processor and computer respectively.

Several microinstructions will usually be required to fetch, decode and execute each machine language instruction, also referred to as "macroinstruction". The microcode may also be responsible for polling for hardware interrupts between each macroinstruction, e.g., checking the status of an input line, sensor, or memory location to see if a particular external event has been registered. Writing microcode is known as "microprogramming".

During the development process of a newly designed processor, it is necessary to perform several verification steps, to determine whether or not the processor or parts of it fulfill a set of established requirements depending on a given phase in its life-cycle. The development process is completed by tests which typically include unit tests, integration tests and finally a system test.

In the development of a CPU implemented with microcode, both the microcode and the processor hardware need to be tested. Since the microcode and the processor hardware are tied together very closely it is hardly possible to test or verify the microcode and the processor hardware thoroughly without having both interact with each other. In current development and test procedures the microcode and the processor hardware are combined for the first time when the processor hardware becomes available, i.e., when the processor or at least a prototype of it has been manufactured. At this point, an integration process starts including testing, modification of the microcode, re-testing and so on, until the developers and testers are satisfied with the results. Up to the start of the integration process the microcode and the processor hardware are tested in heterogeneous, incompatible test and simulation environments. Both can be tested in only rudimentary ways.

In order to speed up the overall development process, there is a need for a method and system for eliminating architectural errors and verifying proper microcode operation as early in the design stage as possible in order to avoid propagation of early development errors.

U.S. Pat. No. 4,520,440 discloses a method of testing the hardware and the microcode associated with a processor under test having a limited instruction set. According to that patent, a minimum test driver, under control of a test processor, loads the data necessary to execute the instruction being tested. After execution of the instruction, the test driver directs capture of the execution results for appropriate use. As an aid in performing the verification test, the test driver is provided with an invalid command that forces return of control to the test processor. The test driver is loaded and run under control of the support processor which provides actual or simulated I/O capabilities. In operation, the processor to be microcoded is tested instruction by instruction, via shared memory, with microcode corrections being made on the same basis to avoid error propagation.

The aforementioned method of testing the processor hardware and the microcode enables the test crew to start testing the microcode together with the associated processor hardware in an earlier stage, before the complete functionality has been implemented in the processor hardware. However, a test or verification that covers all the functionality of the microcode and the processor hardware can still be started only when all the components of the processor hardware are available.

It is therefore an object of the present invention to provide a method and a system that allows a full integrated verification of software and processor hardware comparable early in the design stage.

SUMMARY OF THE INVENTION

The foregoing object is achieved by a method and a system for verifying a processor cooperating with software according to claim 1. The software can be any kind of computer program interacting with the processor, such as basic routines used to start or stop the processor or microcode. Advantageously, the inventive method can be used to verify the correctness of the system behavior of a processor having at least a part of its instructions implemented with microcode. First, the software or microcode is independently tested by using a functional emulator performing in the same way as the hardware of said processor according to the processor's functional specification. Then, the software or microcode is tested by using a hardware emulator behaving in the same way as said hardware of said processor according to the design of said processor's logic gates. Finally, the software or microcode is tested against the actual hardware.

In a preferred embodiment, the method is suitable for verifying a processor implemented with microcode consisting of different kinds of microcode that have to be tested differently. The method further comprises the step of testing the different kinds of microcode separately by using simulators behaving like the functional specification of the hardware on which the different kinds of code are expected to run. Only after completion of such tests are the different kinds of microcode combined and tested together, still using a simulation environment.

The present invention also provides a system for verifying the architectural correctness of a CPU having at least a part of its instruction set implemented with microcode. It can be used for testing microcode that includes different kinds of microcode, namely, millicode procedures and processor code functions. The system comprises a functional emulator performing in the same way as the hardware of the processor according to the processor's functional specification for testing the millicode, a simulator controlling a virtual machine providing a platform for testing the processor code functions, and a hardware emulator behaving in the same way as the hardware of the processor according to the design of the processor's logic gates for testing the microcode.

BRIEF DESCRIPTION OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 1:
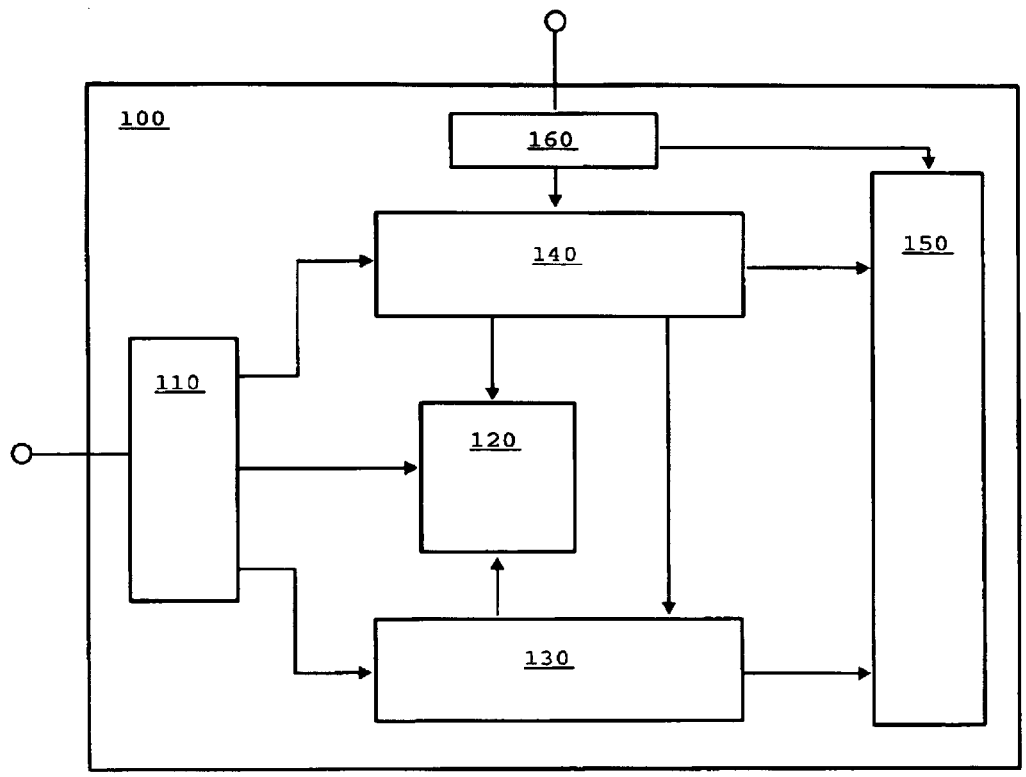
FIG. 1 shows a high level block diagram of a CPU and the implementation of its machine language in microcode; the correctness of the functional behavior of which can be verified using the method in accordance with the present invention.

With reference to FIG. 1, there is depicted a high level block diagram of a CPU 100 and the implementation of its machine language in microcode and hardware respectively. In the following, first, the parts forming the CPU 100 as shown in FIG. 1 are described, and second, a method for verifying the architectural correctness of a CPU having at least a part of its instruction set implemented with microcode according to the present invention is explained in greater detail with reference to the CPU 100. It is understood that the method described here, by way of example with reference to a CPU being partly implemented in microcode, can also be used for a verification of system software communicating with a CPU that does not contain microcode, where the CPU basically consists of the processor and some additional hardware components, such as some RISC (Reduced Instruction Set Computer) processors.

The CPU 100 comprises a first interface 110 forming an architectural interface for providing its machine language instruction to the outside world, e.g., external software, such as an application program being executed on the CPU 100. Many of the functions of the CPU 100 are implemented in microcode, such as the current CMOS S/390 systems manufactured by International Business Machines Corporation. However, the processor hardware makes simple instructions of the processor's architecture directly available to the software, referred to as hardware implemented instructions 120. The hardware implemented instructions 120 can be accessed from outside the CPU 100 via the first interface 110.

The expression "Microcode" denotes micro instructions that are executed within the processor hardware and are neither accessible nor visible to an application program running on the particular CPU. The micro instructions build functions that can be called via the first interface 110 from outside the CPU 100. Two different kinds of microcode can be distinguished: millicode and processor code.

In the case of more complex instructions, such as interrupts and other system functions, the CPU branches to microcode functions. The performance-critical ones of such functions, e.g., most of the instructions running exclusively within the CPU, are implemented solely in millicode forming millicode routines 130. Millicode is written in assembly language, which is a symbolic representation of the machine language of a specific processor. The millicode routines 130 are able to use the processor's hardware implemented instructions 120.

Other functions, such as most of the processor's I/O (Input/Output) instructions and functions for reporting and removing error situations, are executed in combination with processor code forming processor code functions 140. Processor code comprises almost all the instructions of the processor's machine language that are accessible from application programs outside of the CPU 100. Furthermore, the processor code may comprise additional internal instructions implemented in millicode providing the CPU with access to strictly defined hardware elements and configuration data. Hence, the processor code functions 140 are able to call millicode routines 130 as well as hardware implemented instructions 120 and hidden hardware instructions 150.

Moreover, the processor code functions 140 implement system functionality such as Reset and IPL (Initial Program Load). During IML (Initial Microcode Load) the processor code is responsible for initializing the processor's I/O system. In contrast to the millicode, the processor code functions 140 may also be written in a high level language like PL.8 or C.

A third kind of code which is closely tied to the processor hardware and not reachable by application programs is called service element code or short "SE-code". A service element is a separate computer system (not shown) that is used to control the CPU 100. For example, by using the service element a user is able to start IPL and IML, to collect information about the status of operation of the CPU and to configure the CPU via the service element. The service element uses a distinguished second interface 160 to access the hidden hardware instructions 150 and to run processor code functions 140 respectively.

Figure 2:
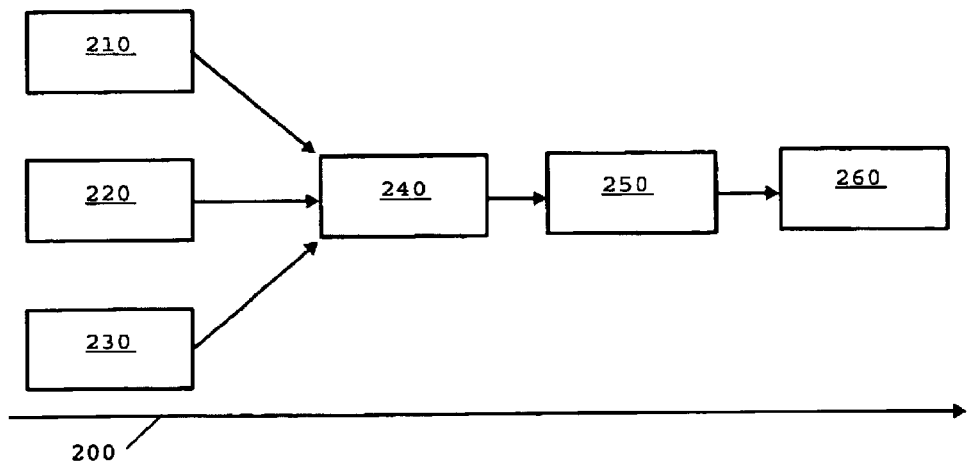
FIG. 2 shows a flow chart illustrating a method for verifying the correctness of the functional behavior of a CPU having at least a part of its instruction set implemented with microcode according to the present invention.

FIG. 2 depicts a flow chart illustrating a method for verifying the correctness of the functional behavior of a CPU having at least a part of its instruction set implemented with microcode. Arrow 200 denotes a time axis illustrating the passage of time in relation to the steps of the method.

In a first step, all different kinds of code that are closely tied to the processor hardware are tested separately. This includes a first test 210 in which the service element code is tested, a second test 220 in which the processor code functions are tested and a third test 230 in which the millicode routines are tested. Preferably, these tests are performed concurrently in order to save time in the overall CPU development. However, without departing from the idea of the present invention, the first, second and third test 210 to 230 may also be performed sequentially in any order.

The service element (SE) code consists primarily of a program running on a independent computer system providing a user interface for controlling the CPU. Without having a connection established to the CPU the SE-code is executed in an 'office mode'. In the office mode, an interface that is used for establishing a communication between the service element and the CPU is deactivated and replaced with simulation routines. These simulation routines behave in accordance with the specified behavior of the CPU connected to the service element.

As aforementioned, the processor code functions mainly implement instructions of the processor's machine language. Therefore, the processor code functions can be run on a simulator using a virtual machine, such as the VM/CMS system (Virtual Machine/Conversational Monitor System) developed by International Business Machines Corporation. A virtual machine is basically a software emulation of a physical computing environment. Depending on the computational capacity of the hardware being used, a system offering the concept of virtual machines provides one or more simultaneous execution environments in which operating systems or other programs may execute as though they were running "on the bare iron", that is, without a particular control program.

During a test run the code being simulated controls all system resources, e.g., the entire memory, all registers and the interrupt control. Advantageously, it is not necessary to take into account the existence of a simulator or any other control program which could interfere with the processor code functions to be simulated. Furthermore, the present invention uses a virtual machine to test the processor code functions, thereby enabling the execution of the exact piece of code that is implemented for a future CPU. The present invention therefore eliminates the undesirable results of prior art methods, such as different program flow in the IML simulation. The invention also eliminates the requirement found in the prior art for a loader program for loading the microcode into a simulated processor CPU, wherein the loader program is completely different from that which is used in the real or actual machine.

The third task of the first step is the test of the millicode procedures. For this test a functional emulator is provided, offering the functional behavior of the processor hardware with which the millicode procedures interact. An emulator is a system that performs in exactly the same way, though not necessarily at the same speed as another system to be emulated. A typical example is emulation of one computer by another. For the implementation of the emulator used for the independent test of the millicode procedures, the functional description of the processor's behavior is taken. Finally, the emulator is used for testing the millicode procedures.

The process of exercising the different code to identify differences between expected and actual behavior is continued until all specified test cases have been successfully tested. Preferably, the test cases are designed to fulfill a requested test coverage. The test coverage is a measure of how thoroughly a test suite exercises a program. This typically involves collecting information about which parts of a program are actually executed when running the test suite, to identify branches of conditional statements which have not been taken.

In a second step, all different kinds of code that are closely tied to the processor hardware are tested in an environment in which all those codes interact as they would run on a real processor as illustrated by step 240. Again, the functional behavior is still simulated by using an enhanced simulator performing the way the processor hardware performs, according to the processor's functional specification. The enhanced simulator executes the processor code functions like the virtual machine system. However, during execution of the processor code functions, the enhanced simulator checks a table specifying all processor code instructions which are meant to be executed using the millicode procedures, instead of using the machine language instructions of the CPU.

The processor code functions are not part of the CPU's machine language. Only the processor code functions are interpreted and executed by the functional emulator. All remaining functions are directly executed. Commands that are interpreted by the functional emulator include, for example, those that relate to acting as the interface between the processor code and hardware implemented as processor code functions. These are not included in the CPU's machine language. Since only the processor code functions are executed by the functional emulator, while the remaining functions are directly executed, the verification process reaches nearly the computational speed of the system to be tested.

In other words, the enhanced simulator is implemented in a similar way as the virtual machine used for testing the processor code procedures in the first step. It also makes use of the concept of the virtual machine. The code to be tested runs on a virtual machine. This approach has the advantage that a complete address space from zero to a defined size, as well as all the registers, are available to the processor hardware being simulated by running the processor code functions. In addition, it is possible to "trap" certain functions and have them interpreted by a simulator. Since all or a subset of millicode procedures called by the processor code functions may now be tested together with the test of the processor code functions, all characteristics of a newly designed CPU and processor hardware respectively may advantageously be tested at the same time.

The links between the virtual machine running the processor code functions, the service element running the SE-code and the functional emulator running the millicode procedures are preferably established using TCP/IP (Transmission Control Protocol over Internet Protocol).

After the test of the second step has reached a requested test coverage, a third step 250 is performed. In the third step 250 the microcode is tested by using a hardware emulator behaving in the same way as the processor hardware according to the design of the processor's logic gates. The hardware emulator allows the precise and detailed mapping of the new processor at the level of the logic gates. After the microcode, i.e., the processor code functions and the millicode procedures, and the SE-code have been tested against a system behaving according to the functional specification of the processor, the microcode runs against a model which behaves the way actual processor hardware behaves. The model uses a hardware emulator that emulates the functional behavior of all of the processor's logic gates.

In a preferred embodiment of the hardware emulator, a high-level description of the processor's behavior is created in VHDL (Very High Speed Integrated Circuit [VHSIC] Hardware Description Language). Then a VHDL simulator is used to run an architecture verification program. Those of ordinary skill in the art will recognize that the VHDL simulator may be used in a similar manner to the way it may be used for hardware verification.

Finally, in a fourth step 260, the microcode is tested by running it on the newly designed processor hardware. The service element code is also tested by allowing it to communicate with the processor hardware.

This invention allows a new CPU to be checked during the initialization and loading phase in a simulation, even before actual system integration. Advantageously, many problems in this area, relating to the interaction of the microcode and the hardware, can be found before the actual hardware is manufactured. Furthermore, the ongoing verification of the newly designed CPU using the method according to the present invention allows detection of hardware problems at a relatively early stage. Thus, it is now possible to start developing and testing necessary microcode changes or extensions straight away.

The present invention can be realized in hardware, software, or in a combination of hardware and software. Any kind of computer system, or other apparatus adapted for carrying out the methods described herein, is suitable. A typical combination of hardware and software may be a general purpose computer system with a computer program that, when being loaded and executed, controls the computer system such that it carries out the methods described herein. The present invention may also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions that are intended to cause a system having an information processing capability to perform a particular function directly, or after either or both of the following a) conversion to another language, code or notation; b) reproduction in a different material form.

What is claimed is:

1. A method for verifying the correctness of the system behavior of a processor cooperating with software, the method comprising the steps of:

testing the software by using a functional simulator performing in the same way as the hardware of the processor according to the processor's functional specification; and testing microcode by using a hardware emulator behaving in the same way as the hardware of said processor according to the design of the processor logic gates, the microcode including millicode procedures and processor code functions; the method further comprising an initial step of testing the millicode procedures and the processor code functions independently.

2. The method of claim 1, whereby the method includes verifying the correctness of the system behavior of a CPU comprising processor hardware and having at least a part of its instructions implemented in microcode.

3. The method of claim 2, whereby testing the millicode procedures includes the step of running the millicode procedures on a functional emulator offering the functional behavior of the processor hardware with which the millicode interacts.

4. The method of claim 2, whereby testing the processor code functions includes the step of running a virtual machine emulating a physical computing environment corresponding to the processor for which the correctness of system behavior is being verified.

5. The method of claim 4, whereby testing the processor code functions includes the step of providing a simulator interpreting processor code instructions which are not provided by said virtual machine.

6. The method of claim 1, whereby said processor is in communication with a service element code that has to be validated as well, the method further comprising the step of testing the service element code independently.

7. The method of claim 6, whereby testing the service element code includes the steps of disconnecting a service element on which the service element is executed from the processor and providing simulation routines behaving like an attached processor according to its functional specification.

8. The method of claim 4, further comprising the step of testing different kinds of microcode in an environment in which all of the microcodes interact as they would run on the processor.

9. The method of claim 8, whereby the step of testing the different kinds of microcode comprises the step of communicating with a service element code.

10. The method of claim 8, whereby testing the different kinds of microcode comprises the step of providing a TCP/IP connection between different systems executing the different kinds of microcodes.

11. The method of claim 8, whereby testing the different kinds of microcode includes the step of specifying particular processor code instructions that are not executed by the virtual machine, but by using microcode procedures instead.

12. The method of claim 8, further comprising the step of testing said microcode by running it on the processor.

13. The method of claim 6, further comprising the step of testing the service element code by letting it communicate with the processor.

14. The method of claim 1, wherein the step of testing the software includes the step of providing a high-level description of the processors functional behavior in a hardware description language, such as VHDL.

15. A computer program product stored on a computer usable medium, comprising computer readable program means for causing a computer to perform a method for verifying the correctness of the system behavior of a processor cooperating with software, the method comprising the steps of:

testing the software by using a functional simulator performing in the same way as the hardware of the processor according to the processor's functional specification; and testing microcode by using a hardware emulator behaving in the same way as the hardware of the processor according to the design of the processors logic gates, the microcode including millicode procedures and processor code functions; the method further comprising an initial step of testing the millicode procedures and the processor code functions independently.

16. A system for verifying the correctness of the functional behavior of a processor having at least a part of its instruction set implemented with microcode, wherein the microcode Includes millicode procedures and processor code functions, the system comprising:

a simulator performing in the same way as the hardware of the processor according to the processors functional specification for testing the millicode;

a virtual machine providing a platform for testing the processor code functions; and a hardware emulator behaving in the same way as the hardware of the processor according to the design of the processor's logic gates for testing the microcode, wherein the millicode procedures and the processor code functions are tested independently.

* * * * *